Aug. 1, 1950  H. A. BERNREUTER  2,517,171
ELECTRIC METER WITH MOLDED CASE
Filed April 24, 1947  2 Sheets-Sheet 1

INVENTOR.
Herbert A. Bernreuter
BY Robert H Wendt
atty

Aug. 1, 1950  H. A. BERNREUTER  2,517,171
ELECTRIC METER WITH MOLDED CASE
Filed April 24, 1947  2 Sheets-Sheet 2
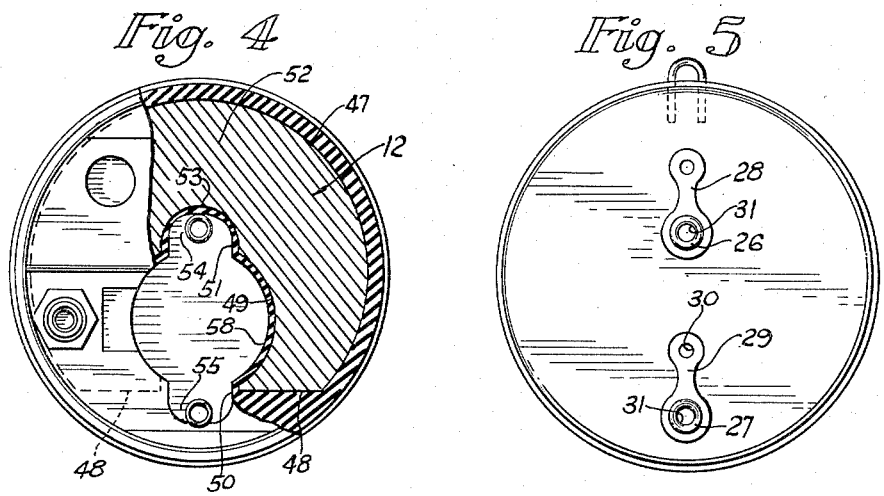
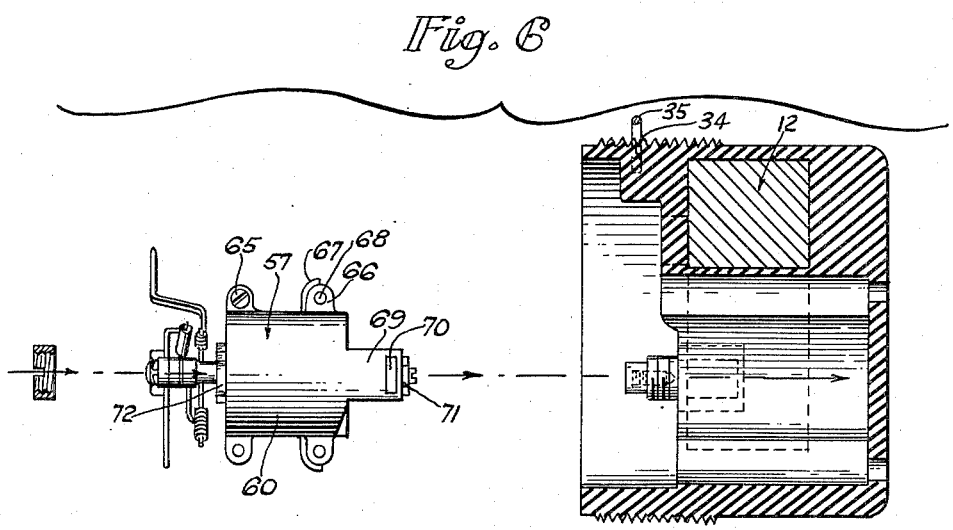
INVENTOR.
Herbert A. Bernreuter
BY Robert H. Wendt
Atty Patented Aug. 1, 1950

2,517,171

UNITED STATES PATENT OFFICE 2,517,171

ELECTRIC METER WITH MOLDED CASE

Herbert A. Bernreuter, Chicago, Ill., assignor to Simpson Electric Company, Chicago, Ill., a corporation of Illinois Application April 24, 1947, Serial No. 743,590

2 Claims. (Cl. 171—95)

The present invention relates to electric meters, and is particularly concerned with electric meters of the moving coil type which employ a movement having a permanent magnet.

One of the objects of the invention is the provision of an improved electric meter structure of the class described in which all of the parts are permanently held together by being embedded in a molded insulating composition such as, for example, a phenolic condensation compound, so that there is no chance of the parts shifting and changing calibration of the instrument, as they may do when fastened by other less secure means, according to the devices of the prior art.

Another object of the invention is the provision of an improved electric meter structure which is adapted to be manufactured by molding mounting studs, brackets, and the magnet in a molded insulation body which also forms a housing, whereby tapping, machining, and other similar operations are avoided, and the assembly of the parts is accomplished by the operator during the molding operation on time which might otherwise not be utilized, but which is necessarily involved for the curing of the molded part. Thus the operator may utilize a pair of molds, and while the molded part in one mold is curing, the parts necessary for assembly may be assembled with the other mold to prepare them for the next molding operation.

Another object of the invention is the provision of an improved electric meter structure embodying a simple assembly by means of which the plating of the magnet may be eliminated, the cost reduced, and the housing simultaneously made with the securement of the magnet embedded in the housing.

Another object of the invention is the provision of an improved meter and meter housing structure in which there is no possibility of cracks between the case and the base, in which the housing may be waterproof and smaller, and may have more accurate sizing for the holes of the movement. The number of parts may be reduced, the quality enhanced, and the cost decreased, and fewer parts are more securely held together according to the present invention.

Other objects and advantages of the invention will be apparent from the following description and the accompanying drawings, in which similar characters of reference indicate similar parts throughout the several views.

Referring to the two sheets of drawings,

Fig. 4 is a view, in partial section, of the housing and magnet unit with the movement removed.

Fig. 5 is a rear elevational view of the meter unit.

Fig. 6 is an exploded view showing the movement apart from the housing in position to be inserted therein.

Figure 1:
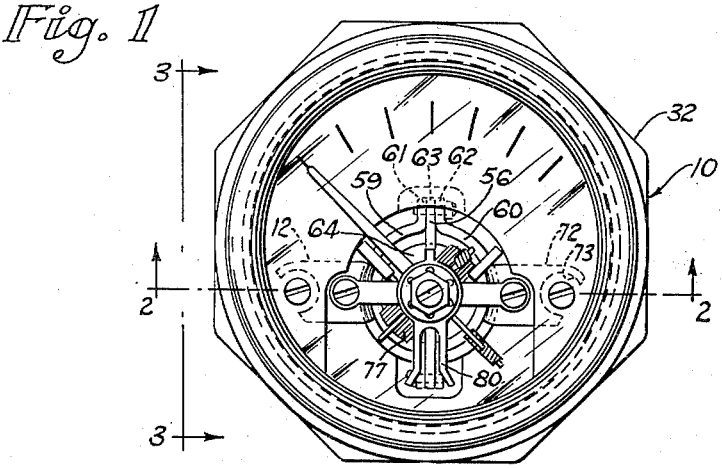
Fig. 1 is a front elevational view of the face of an instrument embodying the invention.
Figure 2:
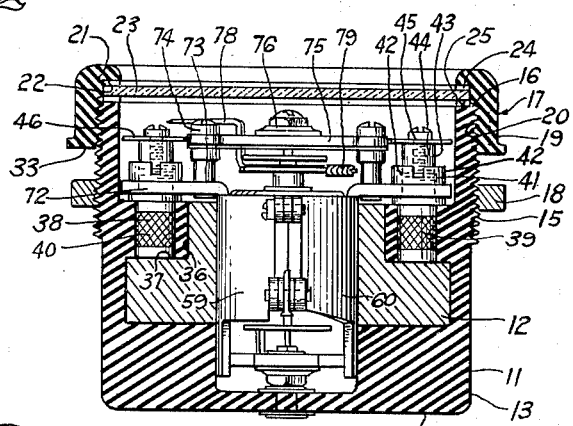
Fig. 2 is a sectional view taken on the plane of the line 2—2 of Fig. 1, looking in the direction of the arrows.
Figure 3:
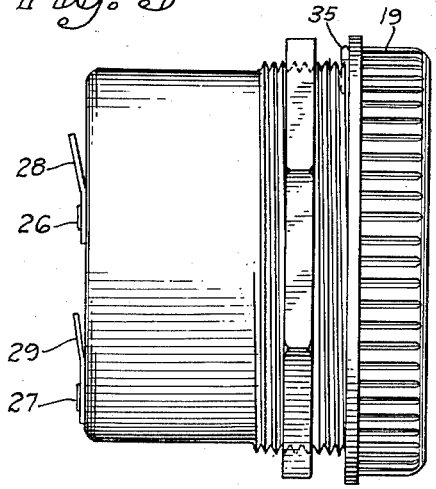
Fig. 3 is a side elevational view taken on the plane of the line 3—3 of Fig. 1, looking in the direction of the arrows.

Referring to Figs. 1 to 3, the present meter unit is indicated in its entirety by the numeral 10, and it comprises a housing member 11 preferably made of a molded phenolic condensation compound in which a permanent magnet 12 has been embedded. The housing unit 11 is preferably substantially cylindrical, its outer cylindrical wall being indicated at 13 and its flat end wall at 14.

The cylindrical wall is provided with external threads 15 adjacent its forward edge 16, and the threads 15 are adapted to receive a bezel ring 17 and a clamping nut 18. The bezel ring 17 is shown as being made also of a phenolic condensation compound, and it comprises an annular member provided at its rear edge with a knurled or grooved cylindrical surface 19 for engagement with the fingers. On its inner surface it is provided with threads 20, and at its forward end it has an inwardly extending radial flange 21, the inner surface 22 of which is adapted to secure the window glass 23 on the housing 11.

A pair of annular rubber gaskets 24 and 25 are preferably located on the opposite sides of the glass 23 to engage the inner surface 22 of the bezel ring and the edge 16 of the housing. Thus the housing may be made water and air tight at this point.

The molded housing 11 is provided in its rear wall with a pair of apertures for receiving the tubular rivets 26 and 27 which support the sheet metal connectors 28, 29, each of which has an aperture 30 for receiving a conductor which connects to the meter movement.

The aperture 31 inside each tubular rivet may be closed by a drop of solder, which also secures to the tubular rivet a conductor leading from the movement of the meter. Thus the housing is hermetically sealed at this side. In some embodiments of the invention the bezel ring 17 may be made of metal.

The nut 18 may comprise an inwardly threaded metal member having an external, non-circular periphery 32, such as, for example, the present nut is octagonal. Nut 18 serves to clamp the meter on a panel, the front of the panel being engaged by the rear edge 33 of the bezel ring 17.

In order to make sure that the meter is secured in upright position as calibrated, the molded housing 11 may be provided on its upper side with a pair of parallel bores 34 for receiving the U-shaped locating pin 35 which engages in a recess on the panel to locate the meter accurately in upright position.

The permanent magnet 12 is preferably substantially rectangular in cross-section, as shown in Fig. 6, except that each of its sides has an angular recess defined by the walls 36, 37 for receiving the metal inserts 38, 39 by means of which the movement is secured to the housing. These recesses, defined by walls 36, 37, are preferably large enough with respect to the inserts so that the inserts may be surrounded with molded material on all sides, the inserts being substantially embedded in it.

Each of the inserts 39 comprises a substantially cylindrical metal member, the cylindrical body being knurled at 40 and provided with a reduced threaded portion 41 which receives the nut 42 which clamps the movement in the housing. Each insert also has a reduced cylindrical portion 43 with a threaded bore 44 for receiving the screw bolt 45 which clamps the dial plate 46 to the movement and housing.

Referring again to the permanent magnet, it may have a substantially cylindrical periphery 47 and may be cut off flat at 48 at the end of each leg. Between the legs the magnet is formed with a substantially cylindrical through bore or aperture 49 which communicates with the flat walled slot 50 below, in Fig. 4, and with another flat walled slot 51 at the yoke 52. The latter slot 51 has its end wall 53 rounded and the spaces provided at 54 and 55 are provided for receiving the securing flange assemblies 56, which will be seen on the moving coil unit in Fig. 1.

The size of the bore 49 relative to the moving coil unit 57 is preferably such that even the inside of the bore 49 and the slots 51 and 50 are lined with the molded insulating material, although it may be relatively thin, such as from five to ten thousandths of an inch.

The moving coil unit 57 has a sliding frictional fit in the bore 58 which is defined by the layer of molding compound on the inside of the bore 49 of the permanent magnet 12.

The moving coil unit is shown in Fig. 6 apart from the housing, and it preferably comprises a pair of sheet metal members 59, 60 of half cylindrical form, having laterally extending attaching flanges 61, 62 at each side. The attaching flanges 61, 62 support a non-magnetic strip 63 which is embedded in and secured to a cylindrical core 64.

The same screw bolts 65 pass through all three flanges 61, 62 and 63 and clamp the pole pieces 59 and 60 in spaced relation to the centrally located core 64.

The lower attaching flanges 66 of each pair of pole pieces are riveted together, and the brass supporting lug 67 may be in the form of a hook resting upon the rivet 68. At its lower end each pole piece has an axial extension 69 which supports a bridge 70 of insulating fibre for carrying the lower jewel and spring assembly 71.

At its upper end each of the pole pieces 59 and 60 has a laterally projecting flange 72, Fig. 6 and Fig. 1, which is provided with an aperture or slot 73 of sufficient size to receive the cylindrical threaded portion 41 on a metal insert 39. The engagement of these slots or apertures 73 with the metal inserts 39 determines the rotative position of the moving coil unit 57 in its socket 58 in the housing.

The nuts 42 clamp the flanges 72 against the housing. The two flanges 72 are also provided with upwardly extending posts 73 between the inserts 38, 39 and the pole pieces 59, 60. The posts 73 are threaded to receive the screw bolts 74 by means of which a metallic bridge 75 is secured on this end of the movement for supporting a jewel and spring assembly 76.

The moving coil itself, 77, Fig. 1, is provided with the usual pintles engaging in the jewels supported by the bridges 75 and 70, and the pointer 78 has the usual counterweight 79. 80 indicates the fork for the zero adjustment rotatably mounted upon the jewel assembly 76 and frictionally held in place by this assembly to determine the zero position by adjusting the position of one end of the spiral spring 78a. The dial plate 46 is held in place by the screw bolts 45 threaded into bores 44 in the inserts 38 and 39.

While the present meter may be made very small, such as an inch and a half over-all diameter, and an inch and a quarter over-all length, it may also be made in the larger sizes, and the same economies may be effected no matter what size the instrument may be.

The operation of the instrument is substantially the same as the moving coil instrument of the prior art. Its structure is, however, very much cheaper, and its parts are held together permanently by the molded material without any possibility of the parts shifting relative to each other and changing the calibration.

The magnet need not be plated; the housing is hermetically sealed against moisture, dirt, or other deleterious influences; and the assembly is accomplished at the same time that the housing is molded. The amount of tapping, drilling, or other machining operations is reduced to a minimum.

It will thus be observed that I have invented an improved meter structure which may be manufactured much more economically than any of the devices of the prior art, yet its accuracy is high, and it is capable of maintaining its calibration for a long period of time without change. The magnet employed is preferably one having high coercive forces, thereby further reducing the size of the assembly.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In an electrical instrument, a cylindrical insulating body member of moldable plastic composition, having a flat rear wall and an open counterbore in its face, a U-shaped permanent magnet lying parallel to said rear wall and imbedded in said plastic on all sides to secure the magnet to the body without need for machining attaching means on the magnet, said body having a substantially cylindrical recess communicating with said counterbore and molded in the plastic between the legs of the magnet, said recess having opposite axial grooves for receiving attaching flanges of a movement unit, a pair of threaded inserts having anchoring formations imbedded in said body and exposed in said counterbore on opposite sides of said magnet and recess, and having exposed threaded portions for receiving a nut in the counterbore, a meter movement unit having cylindrical pole pieces joined at radial attaching flanges, said unit fitting in said recess but being spaced from the inner surfaces of the magnet by a thin layer of the plastic, said unit having opposite apertured securing flanges engaging over said threaded portions of said inserts, and nuts on said inserts for securing the said securing flanges of the unit to the magnet by means of the imbedded threaded members and the plastic holding the magnet.

2. In an electrical instrument, a cylindrical insulating body member of moldable plastic composition, having a flat rear wall and an open counterbore in its face, a U-shaped permanent magnet lying parallel to said rear wall and imbedded in said plastic on all sides to secure the magnet to the body without need for machining attaching means on the magnet, said body having a substantially cylindrical recess communicating with said counterbore and molded in the plastic between the legs of the magnet, said recess having opposite axial grooves for receiving attaching flanges of a movement unit, a pair of threaded inserts having anchoring formations imbedded in said body and exposed in said counterbore on opposite sides of said magnet and recess, and having exposed threaded portions for receiving a nut in the counterbore, a meter movement unit having cylindrical pole pieces joined at radial attaching flanges, said unit fitting in said recess but being spaced from the inner surfaces of the magnet by a thin layer of the plastic, said unit having opposite apertured securing flanges engaging over said threaded portions of said inserts, and nuts on said inserts for securing the said securing flanges of the unit to the magnet by means of the imbedded threaded members and the plastic holding the magnet, each insert having a reduced portion with a threaded bore outwardly of said nut and a flat end on said reduced portion, a dial plate on said flat ends and screw bolts in said latter bores securing said dial plate to the inserts.

HERBERT A. BERNREUTER.

REFERENCES CITED

The following references are of record in the file of this patent:

UNITED STATES PATENTS

| Number | Name | Date |
|---|---|---|
| 1,267,266 | Porter | May 21, 1918 |
| 1,550,240 | Browne | Aug. 18, 1925 |
| 1,806,295 | Kinnard | May 19, 1931 |
| 1,899,885 | Simpson | Feb. 28, 1933 |
| 1,901,197 | Simpson | Mar. 14, 1933 |
| 2,051,399 | Simpson | Aug. 18, 1936 |
| 2,249,454 | Brake | July 15, 1941 |
| 2,277,057 | Bach | Mar. 24, 1942 |

FOREIGN PATENTS

| Number | Country | Date |
|---|---|---|
| 554,779 | Great Britain | July 19, 1943 |

OTHER REFERENCES

Publication, "Electrical Measuring Instrument," by Drysdale and Jolley, vol. 1, page 227, published 1924. (Copy in Patent Office Library TK, 275, D8.)